May 22, 1945. B. WEMPE 2,376,742
PROCESS FOR MAKING SPINNING NOZZLES
Filed March 8, 1941 2 Sheets-Sheet 2
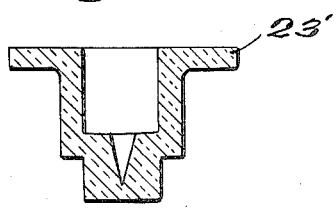
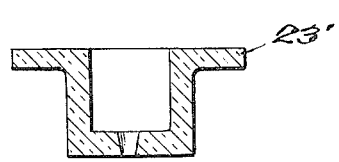
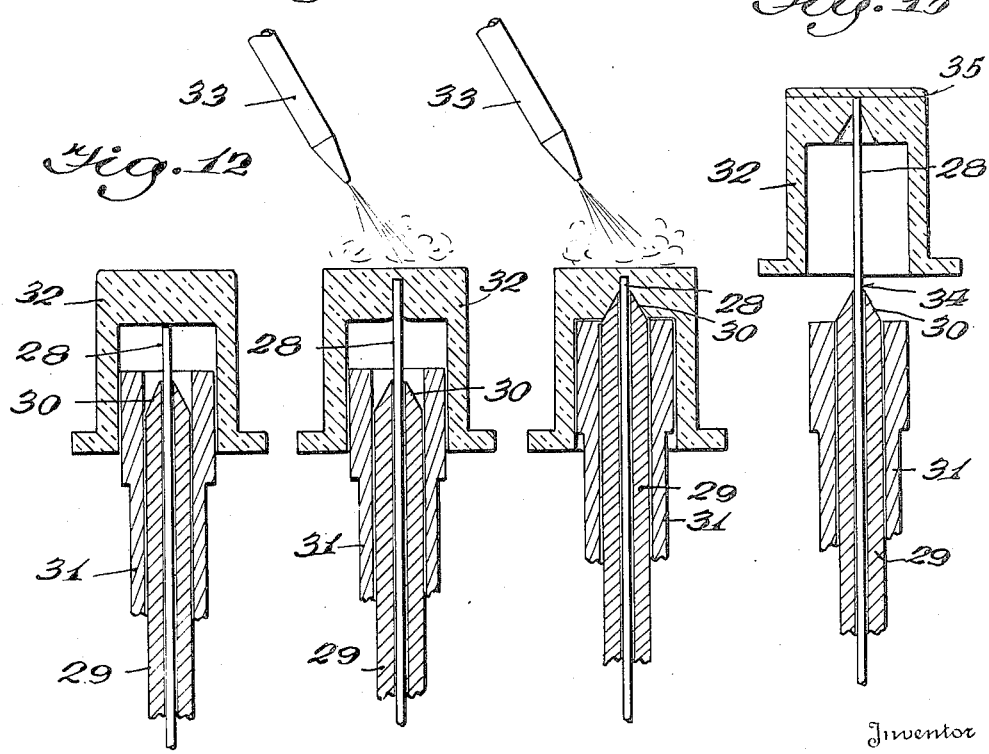
Inventor
Bernhard Wempe
By Allltolcombe
Attorney.

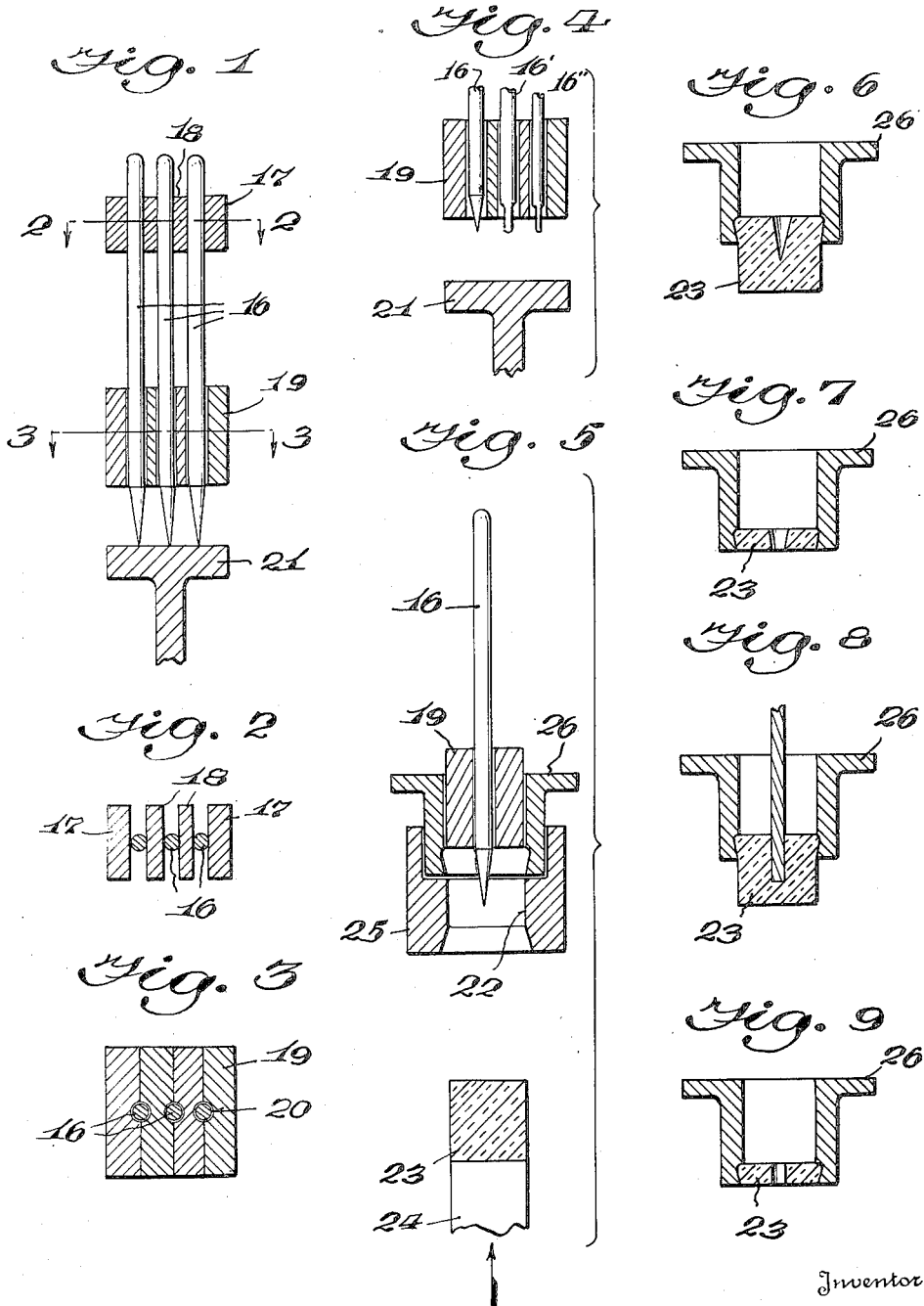

Patented May 22, 1945

2,376,742

UNITED STATES PATENT OFFICE 2,376,742

PROCESS FOR MAKING SPINNING NOZZLES

Bernhard Wempe, Berlin-Schlachtensee, Germany; vested in the Alien Property Custodian Application March 8, 1941, Serial No. 382,311
In Germany February 2, 1940

5 Claims. (Cl. 49—79)

The present invention relates to a method of producing spinning nozzles including glass plates having a plurality of holes of cylindrical or conical or other suitable form. Likewise, the novel method may be used with other materials such as quartz glass which are similar to glass plates so far as their thermal plasticity is concerned. Moreover, organic synthetic materials particularly thermoplastic materials produced either by polymerization or condensation may be used in the same manner.

The essence of the novel method consists in transferring into a plastic state, preferably by heating, the material which is to be provided with holes, and using forming members to provide the desired holes in the plastic materials, and in particular passing these forming members through guides in such a manner that the latter serve to strip the plastic material off of the forming members. Thus the guide remains in permanent contact with the thermoplastic material throughout the production of holes by the forming elements.

It is of course known to produce holes or small openings in spinning nozzles by the use of wire pins or plungers forced through the soft glass of the nozzles. However attempts to produce spinning nozzles according to such methods and in which a large number of bores must be produced, have failed because it is impossible as a practical matter to withdraw this large number of forming members such as wires from the glass as the latter can not withstand such treatment.

These difficulties are obviated according to the present invention by providing a guide member which is formed in such a manner that any glass sticking to the pins is stripped off during withdrawal of the pins from the glass. Moreover the guide member insures absolute parallelism of the individual holes. This guide member preferably is made of steel and the holes provided therein and serving as guides for the pins are of such diameter that the pins may be guided in the holes with practically no play between the wall of the holes and the pins.

Such guide members which must have from 500 to 2500 bores may be made either from a solid body or from plies of sheet metal in which latter case each metal sheet is impressed with a half groove. If this series of plies of sheet metal is assembled with the grooves in registry, then a series of cylindrical guides are formed.

Furthermore the invention relates to producing a large number of holes in thermoplastic masses by means of wires arranged for simultaneous movement through a guide member whereby the wires are pressed into the thermoplastic bodies. In this manner uniformity of diameter may always be obtained even when operating on a large scale. This is important where the production of spinning nozzles for use in the artificial silk industry is concerned.

In the accompanying drawings various modifications are shown by way of example of carrying out this method. In these drawings all views are shown in vertical or longitudinal sections unless otherwise stated.

Fig. 1 is the preferred form of a device for carrying out the new method;

Fig. 2 is a horizontal section on the line 2—2 of Fig. 1;

Fig. 3 is a horizontal section on the line 3—3 of Fig. 1;

Fig. 4 shows modified forms of needles in retracted position;

Fig. 5 shows the needles and guide assembled in a collar to receive the plastic material being molded;

Fig. 6 shows the spinneret prior to the trimming operation;

Fig. 7 shows the completed spinneret;

Fig. 8 shows an alternative form of spinneret using a rod or wire;

Fig. 9 shows the completed spinneret of the alternative form;

Fig. 10 shows a modified form using an integral collar;

Fig. 11 shows the completed form thereof;

Fig. 12 shows the assembly for a further modification using fine wire;

Fig. 13 shows the step of inserting the wire;

Fig. 14 shows the step of flaring the wire opening, and

Fig. 15 shows the stop of separating the spinneret from the molding parts preliminary to severing the wire and trimming the face of the spinneret to expose the end of the wire.

In the preferred modification illustrated in Figs. 1 to 9 inclusive, the holes produced may be cylindrical or conical. The pins 16 may be made of any hard material. A clamping member or holder 17 for these pins maintains them in fixed position after uniform adjustment in height has been effected. Fig. 2 shows the manner in which the pins 16 are held by the clamp 17, the intermediate clamping members are shown at 18. A pin guiding member 19 is provided with guide openings 20. The pins are first adjusted to uniform height of position upon the gage 21. This is effected by loosening the metal sheets of the clamping body 17 so that all the pins may move loosely in the guide 19. As the pins are disposed vertically, they adjust themselves to uniform height. The gage 21 is removed after the pins have been adjusted in position. Before removing this gage the pins are fixed in their adjusted position by fastening together the clamp 17 or the holding metal sheets.

As illustrated in Fig. 5, there is a mold cavity 22 into which the thermoplastic mass 23 of glass or the like is driven with high speed by the pressure of a blow. The thermoplastic mass, for instance glass, is pressed into the mold cavity 22 by means of a stamp 24. If the thermoplastic mass is to be heated, this is done while it rests upon the stamp 24. The high speed and impact pressure are of considerable importance. It is, however, possible to operate at low speed, in which case the particular advantage achieved by the use of high speed is not obtained.

The mold 25 consisting for example of heat resisting steel, has the purpose of exactly pressing the thermoplastic mass, heated to about 600 to 900° C., to the desired position. Reference numeral 26 designates a nozzle, fitting or sleeve for the perforated glass plate. It consists mainly of acid resisting metal, but porcelain or the like material may also be used.

When the softened glass or the thermoplastic mass is pressed into the mold cavity 22 by an impact, it tends to fill even the smallest hollow space. Now if for instance a plate is to be produced having 50 holes, then small pins are used which in the example indicated are ground conically and project from the guide 19 into the softened glass. If the finished hole is to have a diameter of 0.1 mm. then for practical reasons, the pin is given a diameter of 0.3 mm.

After the glass or thermoplastic mass has thus been pressed into the space of the mold cavity 22, and immediately after a slight solidification of the mass the bundle of pointed pins is withdrawn with a jerk. This is effected by lifting the clamp 17 far enough for all the points of the pins to be retracted into the guide 19.

After withdrawal the sleeve 26 with the plastic mass is ejected from the machine and then has the appearance shown in Fig. 6.

To render the form with a pressed thermoplastic mass free of internal stresses, it is annealed in a furnace. Later the lower part of the mass below the sleeve 26 is removed so that the completed spinneret appears as in Fig. 7.

Figs. 8 and 9 show the process when applied to making cylindrical rather than conical holes.

It is not absolutely necessary to use metal or glass as a sleeve 26 and to press the glass into this sleeve, but both the sleeve and the material to be pressed in may consist of a single piece. In this case, the glass to be pressed in is preferably preformed and has the appearance shown in Fig. 10, without however, being provided with the indentations. This glass body is mounted in a holding body or mold, not shown in the drawings which now is heated to a temperature of between 600 and 900° C. At this temperature the thermoplastic mass is soft. Then this mass is moved upwardly as indicated in Fig. 5 by the arrow shown in the part designated 24. Thus the pins are pressed into the bottom of the mass which then has the appearance shown in Fig. 10.

The holes to be pressed in may have any desired form, but preferably they are conical. Fig. 4 shows a variety of such pointed pins. If a cylindrical hole is to be produced in which case it is difficult to withdraw all of the pins simultaneously, the operation is effected in such a manner that wire is used for the pins and these are used not repeatedly but once only and the inserted end of the wire remains in the thermoplastic mass. This is effected as follows:

In Fig. 5 a conical pin is replaced by a wire having a diameter equal to that of the hole to be produced. If a plate having a bottom thickness of about 2 mm. is to be produced the end of the wire projects from the guide 19 about 2.5 to 3 mm. then the usual operations follow, i. e. the pressing in of the heated mass 23 which then surrounds the end of the wire. In contradistinction to the operation previously described, the wire end is not withdrawn but remains in the mass. The removal of the pressed body from the device is effected by pushing the wires so far that the many wires may be cut off closely in the guide 19. Then another adjustment of the height follows using the gage 21.

The wires in this case are held exactly as the pins, i. e. by the clamping bodies 17 and 18. Preferably the pins 16 are pointed by an automatically operating grinding machine. Machines of this kind are adapted to produce points of any form, as shown in Fig. 4, may be had on the market.

Mainly a glass is used as material for the perforating plates. However, quartz glass and other plastic material may be used for this purpose.

It is to be observed that the pins must be protected against oxidizing to insure a sufficiently long life. With the small diameter of the holes, amounting to 0.05 to 0.2 mm., a slight oxidation may readily change the circumference of the needle. For this reason this entire part or the space of the mold cavity 22 and the members 23 and 24 are to be maintained in a hydrogen atmosphere or an atmosphere of neutral gas. As already indicated, Figs. 6 to 11 represent continuous operation in either of two forms. Figs. 6 to 9 show the operation in connection with a bottom consisting as shown in Fig. 2, of another material than the sleeve 26. Figs. 10 and 11 illustrate the successive operations when using a preformed spinneret having a bottom of the same material as the sleeve. In Figs. 6, 7 and 10, 11 the production of a bore of conical shape is shown, whereas Figs. 8 and 9 represent the production of a cylindrical bore. Fig. 4 illustrates by way of example various shapes which the pins may have. In this figure, for instance, three different forms of pins are represented namely conical 16, large cylindrical 16' and small cylindrical 16''.

The pins 16 may consist of any desired hard metal. In practice platinum alloys containing a very high content of iridium, rhodium or other hardening additions have proved to be satisfactory.

In the modification shown in Figs. 12 to 15 the wire 28 is shown in Fig. 12 in its starting position. Fig. 13 illustrates diagrammatically the melting of the wire into the thermoplastic mass. Fig. 14 shows the pressing of the cone into the plastic mass around the contained wire and Fig. 15 illustrates how the tubular pin member 29 is withdrawn from the thermoplastic mass and the upper part of the wire held by the thermoplastic mass is cut off whereupon cutting off of the excess material and etching out of the wire to finish the nozzle is effected.

The wire 28 consists of any desired hard material, preferably tungsten, molybdenum free from carbon alloyed with cobalt or nickel or a combination of the two. A tubular member 29 surrounds the wire 28, and the upper end 30 of this tubular member is conically pointed in the preferred modification. Of course, it is not necessary that the tubular member 29 be pointed at its upper end 30 as shown in the drawings and described in the example selected. The tubular member 29 slides in a guide member or collar 31 the end of which is so constructed as to simultaneously form the bottom. The numeral 32 designates the thermoplastic mass into which the wire 28 is to be pressed or melted in.

From Fig. 12 it is to be seen that the guide member or collar 31 together with the tubular member 29 sliding therein is inserted in a recess of the thermoplastic mass 32 so that the wire 28 projects from the tubular member. Fig. 13 shows how the wire 28 from the above described position is pressed into the thermoplastic mass 32. For this purpose the thermoplastic mass is heated as diagrammatically indicated in the drawings by the burner 33. When the mass is heated the guide member or collar 31 and the tubular member 29 are projected towards the mass 32 so that in the modification selected the conical point 30 of the tubular member 29 also is pressed into the thermoplastic mass (Fig. 14). Thereupon the tubular member 29 together with the collar 31 are quickly withdrawn, or the collar only of the stripping device is retracted, whereupon a condition is reached as is represented in Fig. 15. The thermoplastic mass 32 then is allowed to cool. After cooling and withdrawal of the guide member 29 (Fig. 15) the wire then is cut at the point 34 and the bottom of the mass 32 is ground at 35 until the wire is exposed. When this condition is reached the wire is removed as above described from the cooled mass 32 and a hole of absolute dimensions is obtained in this body.

The new mode of operation produces a large number of holes side by side in a narrow space and obtains spinning nozzles in this manner having a very short cylindrical passage, conically enlarging toward the interior. This is of advantage, as a thick glass bottom is thus obtained which on the one hand withstands large pressures and on the other hand may operate with relatively low spinning pressure.

As already stated, molybdenum and tungsten have proved to be of advantage as materials for the wire and for increasing the hardness may have a content of nickel but must be practically free from carbon. To prevent attack on the wires, or pins, the molding operation preferably is carried out in an atmosphere of a neutral gas such as hydrogen.

What I claim is:

1. The method of forming a spinneret which comprises adjustably and slidingly projecting a series of pins from the face of a guide member, forceably molding plastic material against the face of the guide member and around the ends of the pins, retracting the pins inwardly of the guide member while the material is plastic, hardening the material and trimming the lower end of the spinneret so formed in a plane transverse to its longitudinal axis.

2. The method of forming a spinneret plate within an interiorly grooved collar which comprises arranging a guide member contiguous to the groove in said collar, advancing a series of pins through the guide member to a predetermined point beyond the groove of the collar, forceably molding plastic material in the groove of the collar and around the ends of the pins, retracting the pins inwardly of the guide member while the material is plastic, hardening the material and trimming the lower end of the spinneret so formed in a plane transversely to its longitudinal axis and intersecting the cavities formed by the pins.

3. The method of forming a spinneret plate within an interiorly grooved collar which comprises arranging a guide member contiguous to the groove in said collar, advancing a series of pins through the guide member to a predetermined point beyond the groove of the collar, forceably molding plastic material in the groove of the collar and around the ends of the pins, retracting the pins inwardly of the guide member while the material is plastic, hardening the material, thereafter withdrawing the guide member axially from the collar and trimming the lower end of the spinneret so formed in a plane transverse to its longitudinal axis and intersecting the cavities formed by the pins.

4. The method of forming a spinneret plate within an interiorly grooved collar which comprises arranging a guide member contiguous to the groove in said collar, advancing a series of tapered pins through the guide member and intersecting the plane of the groove in the collar, forceably molding plastic material into the collar and around the ends of the pins, retracting the pins inwardly of the guide member while the material is plastic, hardening the material and trimming the lower end of the spinneret so formed in a plane transverse to its longitudinal axis and intersecting the cavities formed by the pins at points to give said cavities the desired diameters.

5. The method of forming a spinneret which comprises providing a guide member and a series of tubular members slidable through said guide member to a position in which the ends of the tubular members project from the face of the guide member, said tubular members holding wires loosely in advance of the ends of the tubular members, forceably molding plastic material against the face of the guide member and around the ends of the said tubular members and wires, retracting the tubular members inwardly of the guide member while the material is plastic, hardening the material trimming the lower end of the spinneret so formed in a plane transverse to its longitudinal axis and intersecting the wires and dissolving out the portion of the wires held by the molded spinneret.

BERNHARD WEMPE.